(12) United States Patent
Bui et al.

(10) Patent No.: US 7,581,387 B2
(45) Date of Patent: Sep. 1, 2009

(54) EXHAUST GAS MIXING SYSTEM

(75) Inventors: Yung T. Bui, Peoria, IL (US); Balamurugesh Thirunavukarasu, Peoria, IL (US); Subodh Chandra Biswas, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 11/066,474

(22) Filed: Feb. 28, 2005

(65) Prior Publication Data

US 2006/0191254 A1 Aug. 31, 2006

(51) Int. Cl.
*F01N 3/00* (2006.01)
(52) U.S. Cl. ............... 60/286; 60/274; 60/301; 60/303; 60/324
(58) Field of Classification Search ........... 60/274, 60/286, 295, 301, 303, 324; 422/182, 183; 423/212, 235, 239.1
See application file for complete search history.

(56) References Cited

U.S. PATENT DOCUMENTS

| | | | |
|---|---|---|---|
| 3,423,928 A * | 1/1969 | Walsh | 422/182 |
| 4,651,524 A * | 3/1987 | Brighton | 60/274 |
| 4,767,026 A * | 8/1988 | Keller et al. | 222/137 |
| 5,152,967 A * | 10/1992 | Rossetti et al. | 422/194 |
| 5,431,893 A | 7/1995 | Hug et al. | |
| 5,520,460 A | 5/1996 | Lantz | |
| 5,826,428 A * | 10/1998 | Blaschke | 60/303 |
| 5,968,464 A | 10/1999 | Peter-Hoblyn et al. | |
| 5,976,475 A | 11/1999 | Peter-Hoblyn et al. | |
| 5,988,115 A | 11/1999 | Anderson et al. | |
| 5,992,141 A | 11/1999 | Berriman et al. | |
| 6,063,350 A | 5/2000 | Tarabulski et al. | |
| 6,074,619 A * | 6/2000 | Schoubye | 423/239.1 |
| 6,203,770 B1 | 3/2001 | Peter-Hoblyn et al. | |
| 6,315,969 B1 * | 11/2001 | Yoshida | 423/239.1 |
| 6,382,600 B1 | 5/2002 | Mahr | |
| 6,401,455 B1 * | 6/2002 | Mathes et al. | 60/286 |
| 6,449,947 B1 | 9/2002 | Liu et al. | |
| 6,516,610 B2 | 2/2003 | Hodgson | |
| 6,601,385 B2 * | 8/2003 | Verdegan et al. | 60/286 |
| 6,620,391 B2 | 9/2003 | Muller et al. | |

(Continued)

FOREIGN PATENT DOCUMENTS

DE 10306134 A1 9/2003

(Continued)

OTHER PUBLICATIONS

Chemineer Mixers and Agitators, Kenics KMX Static Mixers at www.kenics.com/kmx.php Feb. 23, 2005.

(Continued)

*Primary Examiner*—Tu M Nguyen
(74) *Attorney, Agent, or Firm*—Finnegan, Henderson, Farabow, Garrett & Dunner (57) ABSTRACT

A system for mixing exhaust gas components is provided. The system may include an exhaust passage and a substantially enclosed distribution chamber disposed within the exhaust passage. The distribution chamber may include an outer wall defining a chamber volume and at least one opening disposed in the outer wall configured to provide fluid communication between the chamber volume and the exhaust passage. An additive supply device may be configured to supply at least one exhaust gas additive to the chamber volume.

26 Claims, 6 Drawing Sheets

U.S. PATENT DOCUMENTS

| | | |
|---|---|---|
| 6,722,124 B2 | 4/2004 | Pawson et al. |
| 6,759,021 B1 | 7/2004 | Berthold et al. |
| 7,065,958 B2 * | 6/2006 | Funk et al. .................... 60/286 |
| 2002/0110047 A1 | 8/2002 | Bruck et al. |
| 2002/0121350 A1 | 9/2002 | Lamminen et al. |
| 2002/0162322 A1 | 11/2002 | Ganzmann et al. |
| 2003/0110763 A1 | 6/2003 | Pawson et al. |

FOREIGN PATENT DOCUMENTS

| | | |
|---|---|---|
| WO | WO 97/36676 | 10/1997 |
| WO | WO 98/28070 | 7/1998 |
| WO | WO 2004/046513 | 6/2004 |

OTHER PUBLICATIONS

Chemineer Mixers and Agitators, Kenics HEV Static Mixers at www.kenics,com/hev.php Feb. 23, 2005.

Chemineer Mixers and Agitators, Kenics KM Static Mixers at www.kenics.com/km.php Feb. 23, 2005.

Shinichiro et al., "Apparatus for Denitrating Exhaust Gas, and Urea Vaporizer Used Therefor," JP 2004000867 Abstract only.

Tadashi et al., "Aqueous Urea Spraying Device for Exhaust Gas Denitrification Apparatus," JP 09150038 Abstract only.

* cited by examiner

EXHAUST GAS MIXING SYSTEM

TECHNICAL FIELD

This disclosure pertains generally to exhaust gas mixing systems and, more particularly, to mixing systems for use with selective catalytic reduction systems.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between exhaust gas NOx and ammonia to produce water and nitrogen gas, thereby removing NOx from the exhaust gas.

The ammonia that is used for the SCR system may be produced from liquid urea that is injected into the exhaust gas and converted to ammonia. Thorough mixing of the ammonia and exhaust gas stream may improve the reaction between ammonia and NOx, thereby reducing NOx emissions and preventing the release of highly-reactive ammonia species into the atmosphere.

One system for mixing an exhaust gas stream is disclosed in U.S. Pat. No. 6,722,124, issued to Pawson on Apr. 20, 2004 (hereinafter "the '124 patent"). The system of the '124 patent includes a perforated tubular enclosure that may produce a region of high turbulence in an exhaust gas stream. The system further includes an injector for spraying urea directly into the region of high turbulence to mix the urea and exhaust gas stream.

While the system of the '124 patent may mix the urea with the exhaust gas, the system of the '124 patent has several drawbacks. For example, the system of the '124 patent may increase the pressure of the exhaust gas upstream from the region of high turbulence. This increased pressure may have adverse effects on other machine components. For example, increased exhaust gas pressure may decrease the power output and fuel efficiency of some engines.

The present disclosure is directed at overcoming one or more of the problems or disadvantages in the prior art exhaust gas mixing systems.

SUMMARY OF THE INVENTION

One aspect of the present disclosure includes a system for mixing exhaust gas components. The system may include an exhaust passage and a substantially enclosed distribution chamber disposed within the exhaust passage. The distribution chamber may include an outer wall defining a chamber volume and at least one opening disposed in the outer wall configured to provide fluid communication between the chamber volume and the exhaust passage. An additive supply device may be configured to supply at least one exhaust gas additive to the chamber volume.

A second aspect of the present disclosure includes a method for mixing exhaust gas components. The method may include supplying exhaust gas to an exhaust passage and mixing the exhaust gas with at least one additive by supplying the additive to a substantially enclosed distribution chamber disposed within the exhaust passage.

A third aspect of the present disclosure includes a work machine. The work machine may include an engine, an exhaust passage configured to receive an exhaust gas stream produced by the engine, and an exhaust gas mixing system. The exhaust gas mixing system may include a substantially enclosed distribution chamber disposed within the exhaust passage. The distribution chamber may include an outer wall defining a chamber volume and at least one opening disposed in the outer wall configured to provide fluid communication between the chamber volume and the exhaust passage. An additive supply device may be configured to supply at least one exhaust gas additive to the chamber volume.

DETAILED DESCRIPTION

Figure 1:
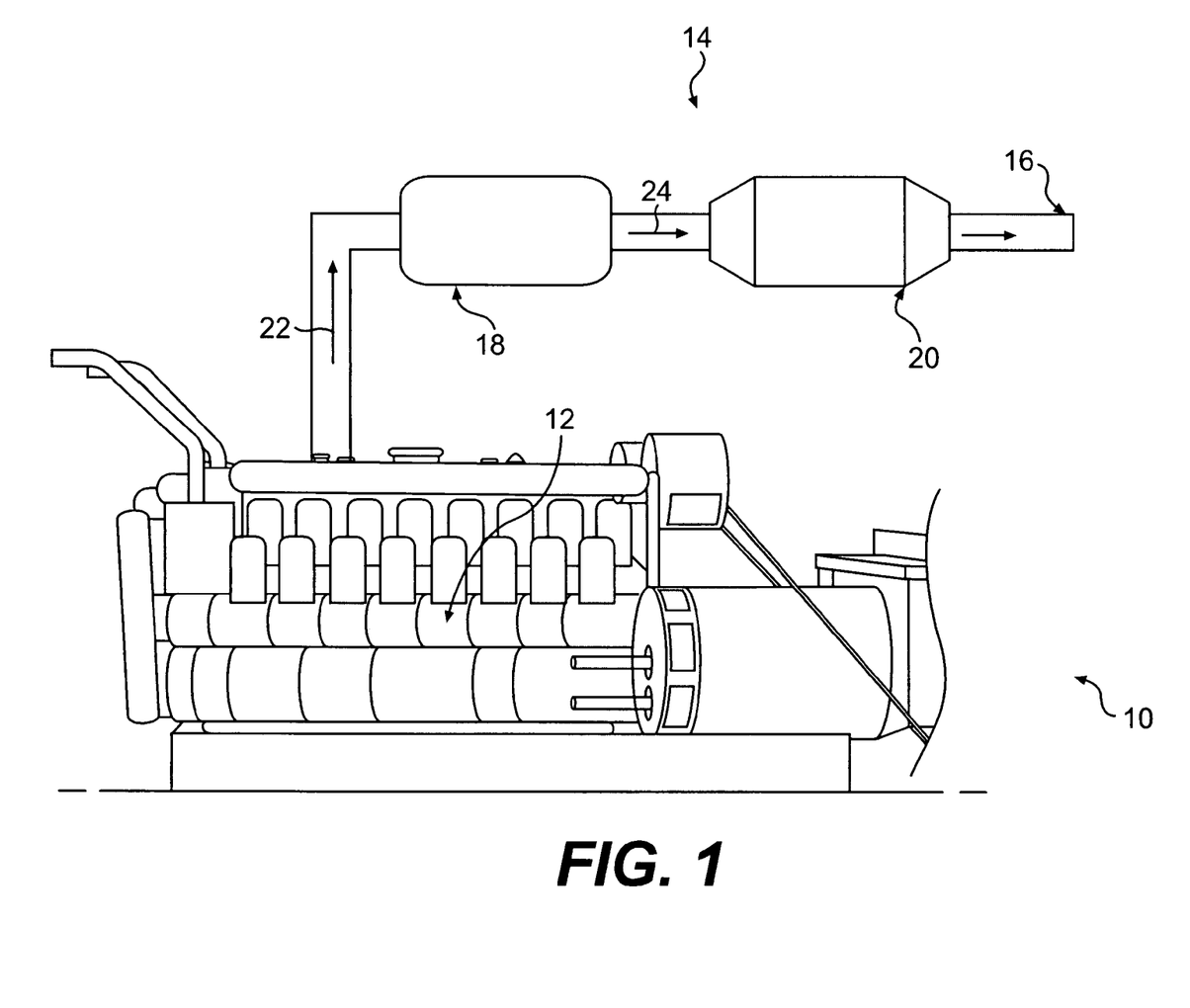
FIG. 1 illustrates a work machine including an exhaust gas mixing system, according to an exemplary disclosed embodiment.

FIG. 1 illustrates a work machine 10 of the present disclosure. As shown, work machine 10 includes a generator set for electrical power production. Work machine 10 may include any work machine 10 that may include an engine 12 and an exhaust system 14 including, for example, oil rigs, highway trucks, excavators, off-highway vehicles, trains, aircraft, and/or ocean vessels. Exhaust system 14 may include an exhaust passage 16, an exhaust gas mixing system 18, and a catalyst 20.

Engine 12 may produce an exhaust gas stream 22 by combustion of a fuel, such as diesel fuel, gasoline, and/or coal. Exhaust passage 16 may be configured to receive exhaust gas stream 22, produced by engine 12. Mixing system 18 may supply one or more additives to exhaust gas stream 22 and may be configured to facilitate mixing of the one or more additives with exhaust gas stream 22 to form a mixed exhaust gas stream 24. Catalyst 20 may be disposed downstream of mixing system 18 and may facilitate a reaction between the one or more additives and other components of mixed exhaust gas stream 24.

Figure 2:
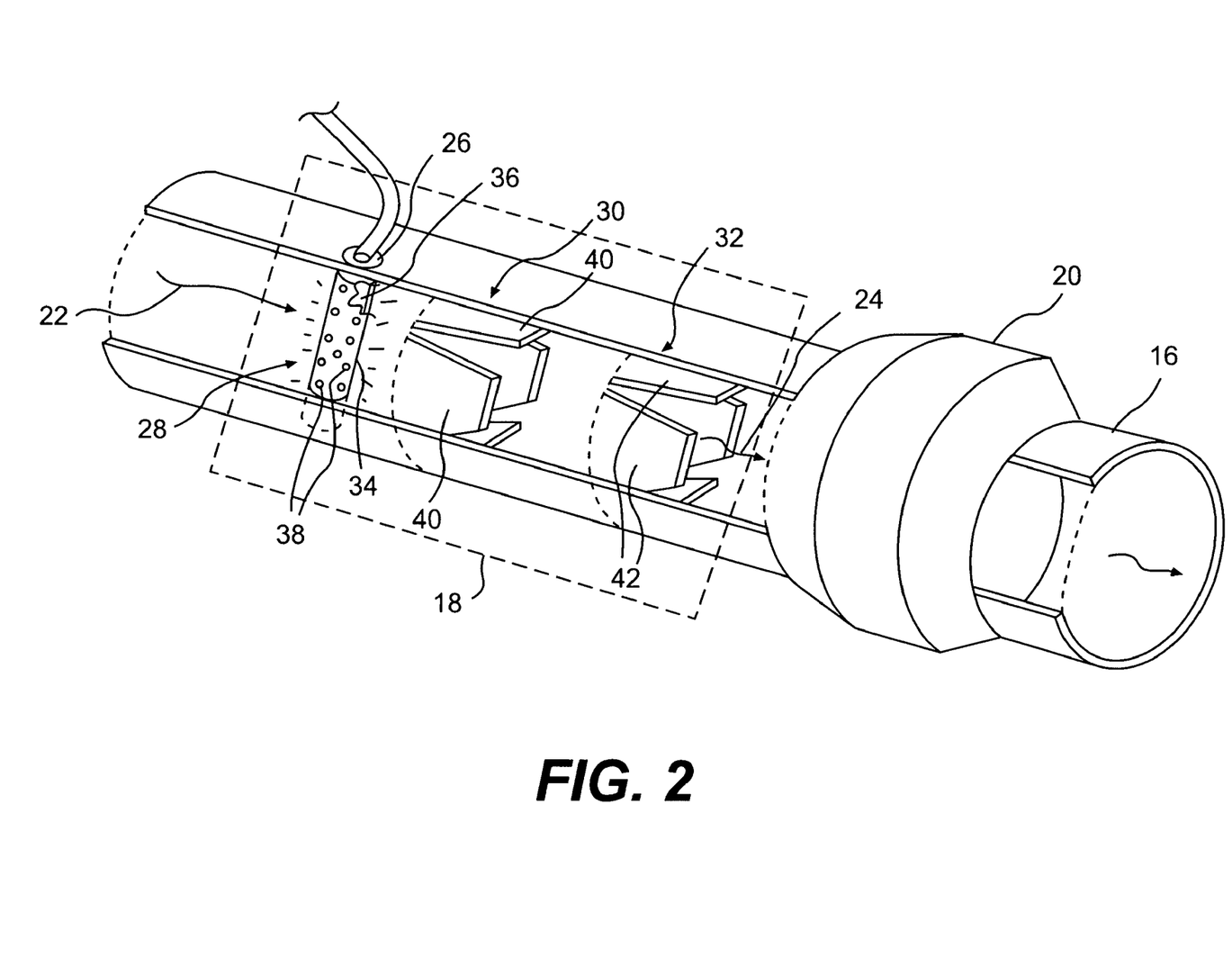
FIG. 2 illustrates an exhaust gas mixing system, according to an exemplary disclosed embodiment.

FIG. 2 illustrates a more detailed view of exhaust gas mixing system 18, according to an exemplary disclosed embodiment. Mixing system 18 may include an additive supply device 26, which may be configured to supply one or more additives to a substantially enclosed distribution chamber 28. Optionally, mixing system 18 may include at least one mixing vane set 30, 32 disposed downstream of additive supply device 26 and distribution chamber 28.

Additive supply device 26 may be selected from a number of suitable supply devices. For example, supply device 26 may include one or more injectors, valves, pumps, nozzles, and/or outlets. Supply device 26 may be configured to control the flow rate, pressure, and/or temperature of one or more additives based on a variety of work machine characteristics including, for example, engine operating characteristics, the size of exhaust passage 16, the amount of exhaust produced by engine 12, and desired effects of the one or more additives.

Supply device 26 may be configured to supply any suitable additive to exhaust stream 22. For example, supply device 26 may be configured to supply a variety of different chemicals including oxidants, reductants, exhaust system cleaning agents, exhaust enriching additives, and/or one or more additives that may facilitate control of exhaust emissions. In one embodiment, the one or more additives may include urea. In another embodiment, the one or more additives may include ammonia.

The one or more additives may be provided in a number of suitable forms. For example, the one or more additives may include liquids, gases, and/or combinations of liquids and gases. Supply device 26 may be configured to supply a liquid, such as urea, for example, combined with a compressed gas to distribution chamber 28.

Distribution chamber 28 may include an outer wall 34, which may define a chamber volume 36. Outer wall 34 may include at least one opening 38, which may provide fluid communication between chamber volume 36 and exhaust passage 16. Supply device 26 may be configured to supply the one or more additives to chamber volume 36. The one or more additives may flow through at least one opening 38 into exhaust stream 22, thereby distributing the one or more additives within exhaust passage 16.

Further, distribution chamber 28 may include a number of different shapes and/or sizes. The shape and/or size of distribution chamber 28 may be selected based on the size and shape of exhaust passage 16. For example, in one embodiment, distribution chamber 28 may have a cylindrical shape, as shown in FIG. 2. The cylindrically-shaped distribution chamber 28 may have one end located near supply device 26, and distribution chamber 28 may extend across a diameter of exhaust passage 16. Further, distribution chamber 28 may optionally contact exhaust passage 16 at either or both ends.

As noted above, distribution chamber 28 may include at least one opening 38 in outer wall 34. The number, size, and/or location of openings 38 may be selected based on a number of factors including, for example, the size of distribution chamber 28 and/or exhaust passage 16, the specific additives that are supplied by supply device 26, and/or the shape of distribution chamber 28. In one embodiment, distribution chamber 28 may include between 1 and 200 openings 38. In another embodiment, distribution chamber 28 may include between 40 and 60 openings 38.

Figure 3A:
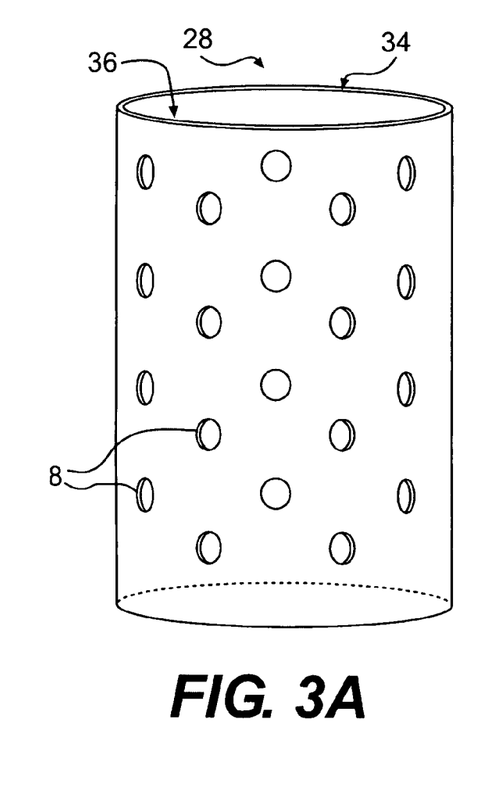
FIGS. 3A-3C illustrate a distribution chamber of an exhaust gas mixing system, according to exemplary disclosed embodiments.
Figure 3B:
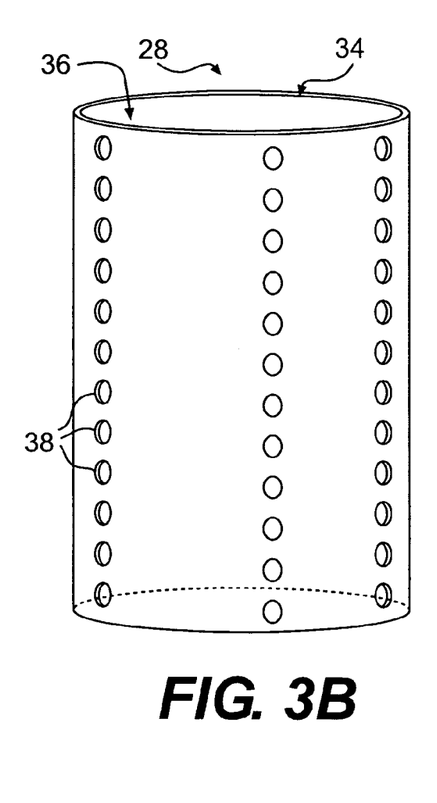
Figure 3C:
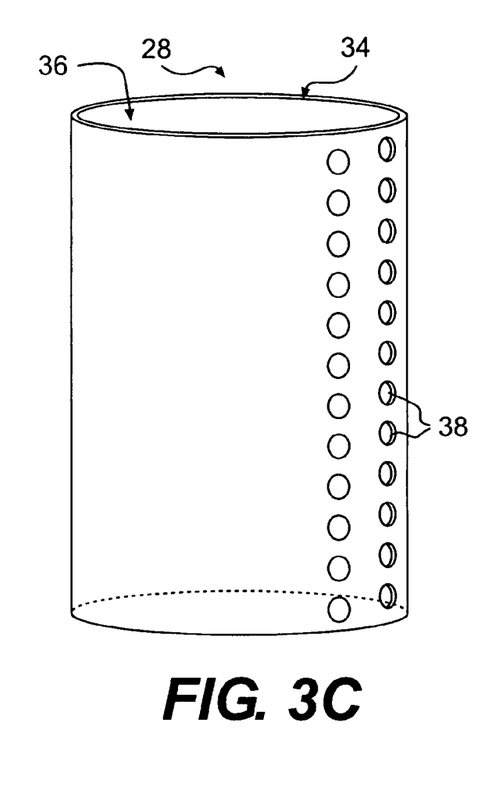

Openings 38 may be positioned in a number of ways on outer wall 34 to provide suitable mixing of the one or more additives with exhaust gas stream 22. FIGS. 3A-3C illustrate several embodiments including different positions for openings 38. For example, in one embodiment, openings 38 may be evenly spaced on wall 34 (FIG. 3A). In another embodiment, openings 38 may be divided into one or more rows and columns (FIG. 3B). In still another embodiment, outer wall 34 may include more openings 38 on one side than on the other side (FIG. 3C) to direct the flow of one or more additives either upstream or downstream in exhaust passage 16. Any suitable opening pattern may be used to mix the one or more additives with exhaust gas stream 22.

As shown in FIGS. 3A-3C, openings 38 may include a plurality of circular holes. However, openings 38 may include a number of shapes to provide suitable mixing of the one or more additives with exhaust gas stream 22. For example, openings 38, may include holes having rectangular, circular, and/or square shapes. In another embodiment, openings 38 may include one or more elongate slits, which may have a number of suitable lengths, shapes, and/or positions on outer wall 34. Any suitable shape may be selected for openings 38.

Outer wall 34 of distribution chamber 28 may be produced from a number of different materials. The specific material may be selected based on cost, manufacturability, wear resistance, heat resistance, and corrosion resistance. In one embodiment, the specific material for outer wall 28 may be selected to have a high corrosion resistance in the presence of an exhaust gas stream 22 and one or more additives, such as urea and/or ammonia.

Mixing system 18 may also include at least one mixing vane set 30, 32 disposed downstream of distribution chamber 28. Mixing vanes sets 30, 32 may be configured to deflect peripherally located exhaust gas and to facilitate mixing of peripherally located exhaust gas and one or more additives. As shown in FIG. 2, mixing system 18 includes two vane sets 30, 32. However, mixing system 18 may include any suitable number of vane sets 30, 32. For example, mixing system 32 may include between 0 and 10 vane sets 30, 32.

Vane sets 30, 32 may be positioned at a number of suitable locations with respect to distribution chamber 28. The specific location of vane sets 30, 32 may be selected based on a number of factors including, for example, the size of exhaust passage 16, exhaust gas pressure, and the desired degree of mixing. For example, in one embodiment, vane set 30 may be positioned downstream of distribution chamber 28 at a distance equal to between one fifth and three times the diameter of exhaust passage 16. Further, vane set 32 may be positioned downstream of vane set 30 at a distance equal to between one fifth and three times the diameter of exhaust passage 16. Any suitable position for vane sets 30, 32 may be selected.

Mixing vane sets 30, 32 may include a number of suitable vane configurations. For example, vane sets 30, 32 may each include between 2 and 10 vanes 40, 42, which may be distributed along the circumference of exhaust passage 16 in a number of suitable ways. For example, in one embodiment, vanes 40, 42 may be evenly spaced around the circumference of exhaust passage 16. In another embodiment, vanes 40, 42 may be unevenly spaced. In still another embodiment, vanes 40, 42 may be evenly spaced in one vane set 30 and unevenly spaced in a second vane set 32. Any suitable number and distribution of vanes 40, 42 may be used.

Figures 4A, 4B, 4C:
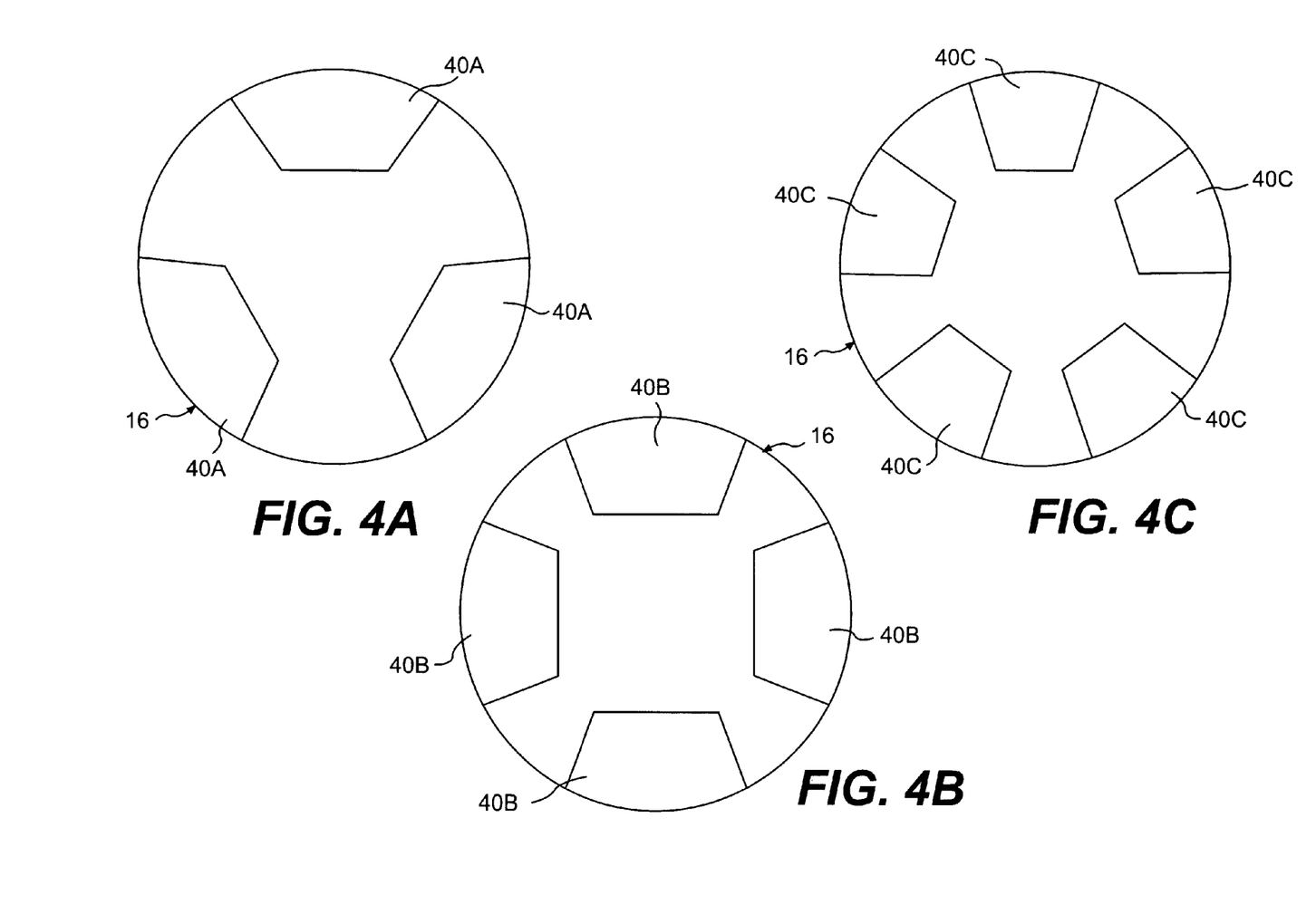
FIGS. 4A-4C provide side end views of a mixing vane set of an exhaust gas mixing system, according to exemplary disclosed embodiments.

FIGS. 4A-4C illustrate a number of embodiments for one vane set 30. However, these embodiments may also be suitable for multiple vane sets 30, 32. In these embodiments, vanes 40 are evenly spaced around the circumference of exhaust passage 16. In one embodiment, as shown in FIG. 4A, vane set 30 may include 3 vanes 40A positioned about 120 degrees apart. In another embodiment, as shown in FIG. 4B, vane set 30 may include 4 vanes 40B positioned about 90 degrees apart. In still another embodiment, as shown in FIG. 4C, vane set 30 may include 5 vanes 40C positioned about 72 degrees apart.

A variety of different vane shapes and sizes may be used. For example, each vane 40, 42 may have a substantially trapezoidal shape (as shown in FIG. 4A-4C). Alternatively, vanes 40, 42 may have an oval, circular, triangular, square, or rectangular shape. Any suitable vane shape may be used as long as vanes 40, 42 are able to deflect the flow of exhaust gas from the periphery of exhaust passage 16 toward the center of exhaust passage 16.

Figure 5:
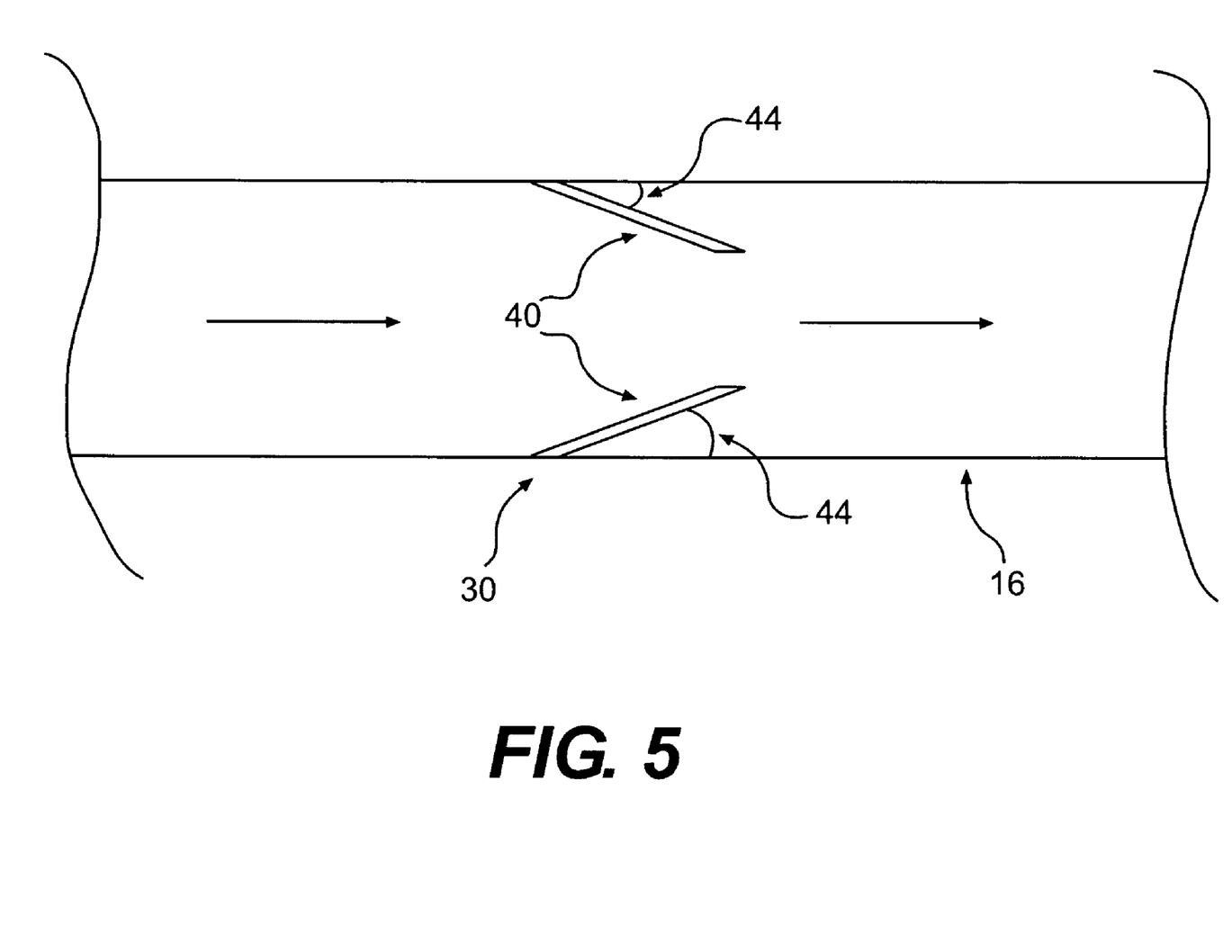
FIG. 5 provides a side perspective view of a mixing vane set of an exhaust gas mixing system, according to an exemplary disclosed embodiment.

Further, vanes 40, 42 may be oriented at a certain angle 44 with respect to exhaust passage 16, as shown in FIG. 5. Any suitable angle may be selected to deflect exhaust gas from the periphery of exhaust passage 16 toward the center of exhaust passage 16. Angle 44 may be selected based on the size of exhaust passage 16, the size of vanes 40, 42, and/or to control the pressure in exhaust passage 16. In one embodiment, angle 44 may be between about 10 and 90 degrees. In another embodiment, vanes 40, 42 may be between about 20 and 40 degrees with respect to exhaust passage 16.

Figure 6A:
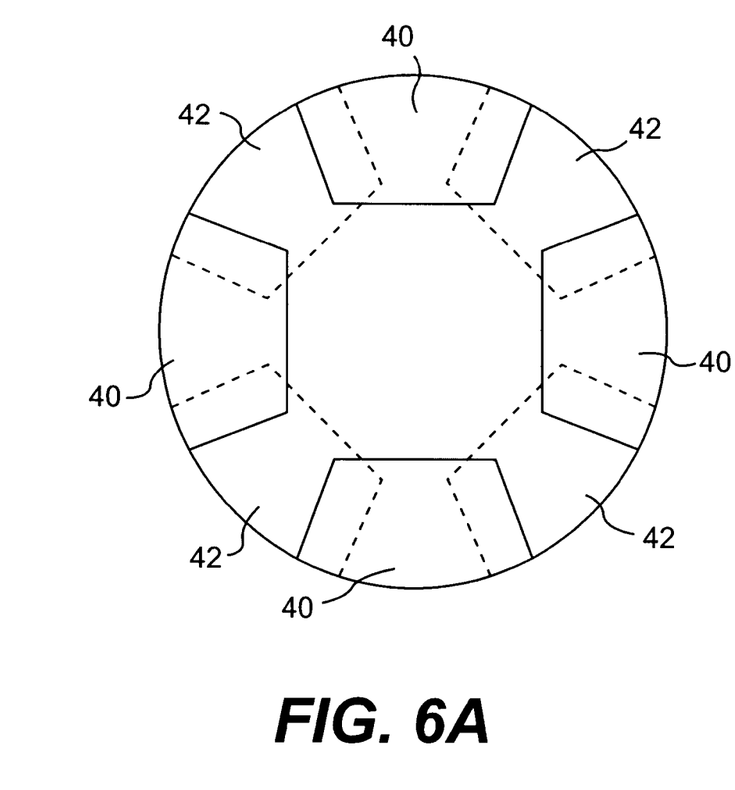
FIGS. 6A-6B provide side end views of multiple mixing vane sets of an exhaust gas mixing system, according to exemplary disclosed embodiments.
Figure 6B:
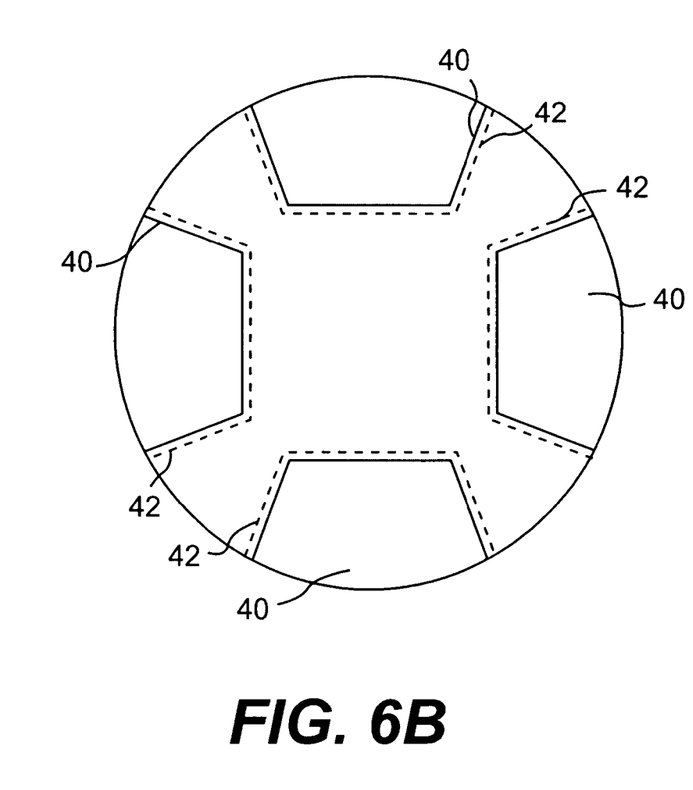

In addition, vanes 40 of one vane set 30 may have a specific alignment with vanes 42 of another vane set 32. For example, FIGS. 6A-6B show various possible alignments for vane sets 30, 32. In one embodiment as shown in FIG. 6A, vane sets 30, 32 may each have four vanes 40, 42 that are spaced ninety degrees apart from the vanes in the same set, and vanes 40 of one vane set 30 may be off-set by about forty-five degrees from vanes 42 of second vane set 32. In another embodiment, as shown in FIG. 6B, vanes 40 of one vane set 30 may be aligned with vanes 42 of second vane set 42. Any alignment that provides a desired degree of mixing of exhaust gas stream 22 and the one or more additives may be selected.

Mixing system 18 may be designed to control the pressure drop across mixing system 18 in exhaust passage 16. The pressure drop across mixing system 18 may be determined by measuring the difference in the exhaust gas pressure upstream from mixing system 18 and the exhaust gas pressure downstream from mixing system 18. In one embodiment, mixing system 18 may be configured to produce a pressure drop of less than about 1 inch of water (approximately 249 Pascal). Particularly, in one embodiment, mixing system 18 may be configured to produce a pressure drop of less than about 0.5 inches of water (approximately 124.5 Pascal).

The pressure drop may be controlled by selecting certain sizes and shapes for distribution chamber 28 and vane sets 30, 32. For example, in one embodiment, exhaust passage 16 may have a circular cross-sectional geometry with a diameter of about 10 inches. Mixing system 18 may include a distribution chamber 28 having a cylindrical shape and extending across a diameter of exhaust passage 16, as well as two sets of mixing vanes 30, 32. Distribution chamber 28 may have a cylinder diameter between about 0.6 and 0.8 inches and may include between about 40 and 60 circular openings 38 with a diameter between about 0.1 and 0.3 inches. Vane sets 30, 32 may each include four vanes 40, 42 spaced 90 degrees apart and having a length of about 4 to 5 inches and a width of about 3 to 4 inches. One vane set 30 may be offset by about 45 degrees with respect to second vane set 32.

The specific size and shape of distribution chamber 28 and mixing vanes 40, 42 may be varied based on other machine characteristics. For example, distribution chamber 28 and vanes 40, 42 may be made larger or smaller based on the size of exhaust passage 16. Further, some machines may include engines that produce low exhaust gas pressure. Alternatively, or in addition, some machines may control exhaust gas pressure using other components such as forced-induction systems, vents, and/or pressure-relief valves. In these machines, larger or smaller distribution chambers 28 and/or mixing vanes 40, 42 may be used.

Catalyst 20 may include a number of suitable catalyst types. For example, catalyst 20 may include an SCR catalyst, a three-way catalyst, and/or an oxidation catalyst. Further, multiple catalysts 20 may be included in exhaust passage 16, and the catalysts may be positioned upstream and/or downstream of mixing system 18. In one embodiment, catalyst 20 may include an SCR catalyst, and supply device 26 may be configured to supply at least one of urea and ammonia to chamber volume 36.

INDUSTRIAL APPLICABILITY

The present disclosure provides an exhaust gas mixing system. The mixing system may be used to combine one or more additives, such as urea or ammonia, with an exhaust gas stream. The system may be used with any machine in which it is desirable to mix one or more additives with an exhaust gas stream.

System 18 may include distribution chamber 28 disposed in an exhaust passage 16 upstream of an SCR catalyst system 20. Ammonia and/or urea may be injected into distribution chamber 28 to facilitate mixing with an exhaust gas stream 22. Mixing system 18 may provide several advantages over other mixing systems. System 18 may provide thorough mixing in all regions of exhaust passage 16, including central and peripheral regions. Thorough mixing may facilitate complete reaction of ammonia with NOx species at SCR catalyst 20, thereby reducing NOx emissions and preventing ammonia slip.

It should be noted that although mixing system 18 is particularly described for use with an SCR catalyst, mixing system 18 may be used with any catalyst system. For example, mixing system 18 may be configured to mix one or more exhaust gas enriching agents and/or reductants with exhaust gas stream 22. These enriching agents and/or reductants may be mixed with exhaust gas stream 22 to facilitate a number of exhaust system operations that require different catalyst types. Such operations may include, for example, exhaust system desulfation, on-board ammonia production, diagnostics tests, etc.

Mixing system 18 of the present disclosure can provide thorough mixing without sacrificing engine performance. Any changes in the flow path of exhaust passage 16, including the addition of mixing system 18, may affect the pressure of exhaust gases within exhaust passage 16. Particularly, some mixing systems may cause high backpressure on upstream machine components, including engine 12. The high backpressure may adversely affect the operation of these components, causing reduced power output and poor fuel efficiency. Mixing system 18 of the present disclosure can provide thorough mixing of the exhaust gas stream 22 and additives without causing significant changes in exhaust gas pressure.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A method for mixing exhaust gas components, comprising:
    supplying exhaust gas to an exhaust passage;
    mixing the exhaust gas with at least one additive by supplying the at least one additive to a substantially enclosed distribution chamber disposed within the exhaust passage; and
    further mixing the exhaust gas by deflecting peripherally flowing exhaust gases using two or more sets of mixing vanes disposed downstream of the distribution chamber, wherein the vanes are disposed about a periphery of the exhaust passage and include a central opening, and wherein the vanes of each set of mixing vanes are approximately evenly spaced about the periphery of the exhaust passage, and a first set of mixing vanes is angularly-offset with respect to a second set of mixing vanes positioned downstream of the first set of mixing vanes.

2. The method of claim 1, wherein the distribution chamber includes:

an outer wall defining a chamber volume; and
at least one opening disposed in the outer wall and configured to provide fluid communication between the chamber volume and the exhaust passage.

3. The system of claim 1, wherein the two or more sets of mixing vanes each include the same number of vanes.

4. The method of claim 1, wherein the exhaust gas additive includes ammonia.

5. The method of claim 1, wherein the exhaust gas additive includes urea.

6. The method of claim 1, wherein the at least one opening includes a plurality of holes.

7. The method of claim 1, wherein the two or more sets vanes includes two sets of vanes and the first set of vanes is angularly offset with respect to the second set of vanes.

8. The method of claim 1, further including exposing at least a portion of the exhaust gas and at least one additive to a catalyst.

9. The method of claim 8, wherein the catalyst includes a selective catalytic reduction system catalyst.

10. A system for mixing exhaust gas components, comprising:
an exhaust passage;
a substantially enclosed distribution chamber disposed within the exhaust passage and including:
an outer wall defining a chamber volume;
at least one opening disposed in the outer wall configured to provide fluid communication between the chamber volume and the exhaust passage;
an additive supply device configured to supply at least one exhaust gas additive to the chamber volume; and
two or more sets of mixing vanes disposed downstream of the distribution chamber, wherein the vanes are disposed about a periphery of the exhaust passage and include a central opening, and wherein the vanes of each set of mixing vanes are approximately evenly spaced about the periphery of the exhaust passage, and a first set of mixing vanes is angularly offset with respect to a second set of mixing vanes positioned downstream of the first set of mixing vanes.

11. The system of claim 1, wherein the exhaust gas additive includes ammonia.

12. The system of claim 10, wherein the exhaust gas additive includes urea.

13. The system of claim 10, wherein the distribution chamber includes a substantially cylindrical shape.

14. The system of claim 10, wherein the exhaust gas pressure drop across the system is less than one inch of water.

15. The system of claim 10, wherein the at least one opening includes a plurality of holes.

16. The system of claim 10, wherein the two or more sets of vanes includes two sets of vanes and the first set of vanes is angularly offset with respect to the second set of vanes.

17. The method of claim 10, wherein the two or more sets of mixing vanes each include the same number of vanes.

18. The system of claim 17, wherein the two or more sets of vanes each include between three and five vanes.

19. The system of claim 10, further including at least one catalyst disposed downstream of the distribution chamber.

20. The system of claim 19, wherein the catalyst includes a selective catalytic reduction system catalyst.

21. A machine, comprising:
an engine;
an exhaust passage configured to receive an exhaust gas stream produced by the engine;
an exhaust gas mixing system, including: a substantially enclosed distribution chamber disposed within the exhaust passage and including:
an outer wall defining a chamber volume;
at least one opening disposed in the outer wall configured to provide fluid communication between the chamber volume and the exhaust passage; an additive supply device configured to supply at least one exhaust gas additive to the chamber volume; and
two or more sets of mixing vanes disposed downstream of the distribution chamber, wherein the vanes are disposed about a periphery of the exhaust passage and include a central opening, and wherein the vanes of each set of mixing vanes are approximately evenly spaced about the periphery of the exhaust passage, and a first set of mixing vanes is angularly offset with respect to a second set of mixing vanes positioned downstream of the first set of mixing vanes.

22. The machine of claim 21, wherein the additive supply device is configured to supply at least one of urea and ammonia to the chamber volume.

23. The machine of claim 21, wherein the machine includes a generator set.

24. The machine of claim 21, wherein the two or more sets vanes includes two sets of vanes and the first set of vanes is angularly offset with respect to the second set of vanes.

25. The machine of claim 21, further including at least one catalyst disposed downstream of the exhaust gas mixing system.

26. The machine of claim 25, wherein the at least one catalyst includes a selective catalytic reduction system catalyst.

* * * * *